(12) United States Patent
Hatanaka et al.

(10) Patent No.: US 10,658,696 B2
(45) Date of Patent: May 19, 2020

(54) NONAQUEOUS SECONDARY BATTERY

(71) Applicant: NISSAN CHEMICAL INDUSTRIES, LTD., Tokyo (JP)

(72) Inventors: Tatsuya Hatanaka, Funabashi (JP); Yuki Shibano, Funabashi (JP); Takuji Yoshimoto, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 31 days.

(21) Appl. No.: 15/777,969

(22) PCT Filed: Nov. 25, 2016

(86) PCT No.: PCT/JP2016/084898
§ 371 (c)(1),
(2) Date: May 22, 2018

(87) PCT Pub. No.: WO2017/094598
PCT Pub. Date: Jun. 8, 2017

(65) Prior Publication Data
US 2018/0337420 A1 Nov. 22, 2018

(30) Foreign Application Priority Data

Dec. 1, 2015 (JP) .................................. 2015-234730

(51) Int. Cl.
| | | |
|---|---|---|
| *H01M 10/0525* | (2010.01) | |
| *H01M 4/136* | (2010.01) | |
| *H01M 10/0568* | (2010.01) | |
| *H01M 10/0569* | (2010.01) | |
| *H01M 4/58* | (2010.01) | |
| *H01M 4/62* | (2006.01) | |
| *H01M 4/66* | (2006.01) | |
| *H01M 4/36* | (2006.01) | |
| *H01B 1/24* | (2006.01) | |
| *H01M 4/02* | (2006.01) | |

(52) U.S. Cl.
CPC .......... *H01M 10/0525* (2013.01); *H01B 1/24* (2013.01); *H01M 4/136* (2013.01); *H01M 4/366* (2013.01); *H01M 4/5825* (2013.01); *H01M 4/622* (2013.01); *H01M 4/625* (2013.01); *H01M 4/661* (2013.01); *H01M 10/0568* (2013.01); *H01M 10/0569* (2013.01); *H01M 2004/021* (2013.01); *H01M 2300/0037* (2013.01); *Y02T 10/7011* (2013.01)

(58) Field of Classification Search
CPC .. H01M 10/0525; H01M 4/661; H01M 4/625; H01M 4/5825; H01M 4/366; H01M 4/622; H01M 4/136; H01M 10/0569; H01M 10/0568; H01M 2300/0037; H01M 2004/021; Y02T 10/7011; H01B 1/24
USPC ........................................................ 429/332
See application file for complete search history.

(56) References Cited

U.S. PATENT DOCUMENTS

| | | |
|---|---|---|
| 8,221,915 B2 | 7/2012 | Tikhonov et al. |
| 2012/0244425 A1 | 9/2012 | Tokuda |
| 2013/0084493 A1* | 4/2013 | Tokuda ............... H01M 4/5825 429/200 |
| 2013/0280599 A1 | 10/2013 | Matsumoto et al. |
| 2015/0228982 A1 | 8/2015 | Shibano et al. |

FOREIGN PATENT DOCUMENTS

| | | |
|---|---|---|
| JP | 6-231754 A | 8/1994 |
| JP | 11-185807 A | 7/1999 |
| JP | 2002-203562 A | 7/2002 |
| JP | 2013-546137 A | 12/2013 |
| JP | 2015-26625 A | 2/2015 |
| JP | 2016-149189 A | 8/2016 |
| WO | WO 2012/093616 A1 | 7/2012 |

OTHER PUBLICATIONS

International Search Report, issued in PCT/JP2016/084898, PCT/ISA/210, dated Feb. 14, 2017.
Written Opinion of the International Searching Authority, issued in PCT/JP2016/084898, PCT/ISA/237, dated Feb. 14, 2017.
Extended European Search Report dated Oct. 5, 2018, in European Patent Application No. 16870535.8.

* cited by examiner

*Primary Examiner* — Gary D Harris
(74) *Attorney, Agent, or Firm* — Birch, Stewart, Kolasch & Birch, LLP

(57) ABSTRACT

A nonaqueous secondary cell provided with: a positive electrode provided with a positive-electrode current-collecting substrate and a positive-electrode active material layer formed thereon, the positive-electrode active material layer being able to absorb or discharge lithium; a negative electrode provided with a negative-electrode current-collecting substrate and a negative-electrode active material layer formed thereon, the negative-electrode active material layer being able to absorb or discharge lithium; a separator interposed between the positive and negative electrodes; and a nonaqueous electrolyte solution. The nonaqueous electrolyte solution contains a sulfonyl imide electrolyte and a nonaqueous organic solvent. An electroconductive protective layer obtained by dispersing an electroconductive carbon material in a binder resin is formed on one or both surfaces of the positive-electrode current-collecting substrate and/or the negative-electrode current-collecting substrate. Regardless of whether the nonaqueous electrolyte solution including the sulfonyl imide electrolyte is used, the nonaqueous secondary cell has good cycle characteristics and high output characteristics.

11 Claims, No Drawings

NONAQUEOUS SECONDARY BATTERY

TECHNICAL FIELD

The present invention relates to a nonaqueous secondary cell. More specifically, the invention relates to a nonaqueous secondary cell having an electrode which uses a current-collecting substrate that is provided with an electrically conductive protective layer, and having an electrolyte solution containing a sulfonylimide electrolyte that is corrosive to the current-collecting substrate.

BACKGROUND ART

With the need for smaller sizes, lower weights and higher functionality in portable electronic devices such as smart phones, digital cameras and handheld game consoles, active progress has been made recently in the development of high-performance batteries, and demand for secondary cells, which can be repeatedly used by charging, is growing rapidly.

Lithium ion secondary cells in particular, because of their high energy density and high voltage, and also because they lack a memory effect during charging and discharging, are the secondary cells currently undergoing the most vigorous advances in development.

Lithium ion secondary cells have a structure in which a container houses a positive electrode and a negative electrode capable of intercalating and deintercalating lithium and a separator interposed between the electrodes, and is filled with an electrolyte solution (in the case of lithium ion polymer secondary cells, a gel-like or completely solid electrolyte instead of a liquid electrolyte solution).

The positive electrode and negative electrode are generally produced by forming, on a current-collecting substrate such as copper foil or aluminum foil, a layer made of a composition that includes an active material capable of intercalating and deintercalating lithium, an electrically conductive material composed primarily of a carbon material, and a binder resin. The binder is a material that can be used to bond the active material with the conductive material, and also to bond these with the metal foil. Commercially available materials of this type include, for example, N-methylpyrrolidone (NMP)-soluble fluoropolymers such as polyvinylidene fluoride (PVdF), and aqueous dispersions of olefin polymers.

As part of recent efforts to tackle environmental problems, active progress is being made in the development of electrical vehicles. Lithium ion secondary cells are also expected to serve as the power source for such vehicles.

To this end, there exists a desire for lithium ion secondary cells which are endowed with even higher cycle characteristics, safety, capacity and output characteristics than up until now, and are also of lower cost.

It is known that batteries of high thermal stability and chemical stability can be produced by using sulfonylimide electrolytes as the nonaqueous electrolyte in lithium ion secondary cells. The reason is that, compared with the lithium hexafluorophosphate ($LiPF_6$) commonly used as the electrolyte in lithium ion secondary cells, sulfonylimide electrolytes have a high thermal stability and hydrolysis stability.

However, a drawback with the use of sulfonylimide electrolytes is that the aluminum foil which is widely used as an electrode current-collecting substrate is corroded within the working voltage range of the cell, resulting in declines in the cycle characteristics and the capacity of the cell.

For this reason, sulfonylimide electrolytes are not commonly used.

To resolve this problem of corrosion, Patent Document 1 reports on the approach of adding a lithium salt such as $LiPF_6$ or $LiBF_4$ to a sulfonylimide electrolyte-containing nonaqueous electrolyte solution, and discloses that this can prevent the corrosion of an aluminum core serving as the current-collecting substrate of a positive electrode while suppressing a decline in the cell characteristics during high-temperature use and high-temperature storage.

The reason why this art can prevent the corrosion of an aluminum core is that, with cell charging and discharging, the $LiPF_6$ or $LiBF_4$ that is added forms a non-conductive film on the surface of the aluminum core, thus guarding against direct contact between the sulfonylimide electrode and the aluminum core.

However, when such an additive that forms a non-conductive film on a current-collecting substrate is used, the non-conductive film—which is a resistor—gradually grows with repeated charging and discharging, and so the resistance at the interface between the current-collecting substrate and the active material increases and the output characteristics of the cell decrease.

A drawback with the use of $LiPF_6$ as the additive is that, owing to its low thermal stability and low chemical stability, improvements in the thermal and chemical stabilities of the cell are inadequate. When $LiBF_4$ is used as the additive, the $BF_4^-$ ions that form have a small diameter and interactions with lithium ions increase; hence, the degree of ion dissociation within the electrolyte solution decreases, resulting in a large cell internal resistance.

Patent Document 2 reports that by using as the current-collecting substrate an aluminum compact having an $AlF_3$ film formed on the surface, reactions between the sulfonylimide electrolyte and the aluminum can be suppressed.

But because reactions between the aluminum and the sulfonylimide electrolyte cannot be adequately suppressed with an $AlF_3$ film alone, here too, corrosion of the current-collecting substrate gradually proceeds and the cell capacity inevitably declines.

Patent Document 3 reports that by vapor depositing a lithium compound such as lithium fluoride or lithium carbonate onto a current-collecting substrate so as to provide a protective layer, reactions between a sulfonylimide electrolyte and the current-collecting substrate can be suppressed. However, drawbacks of this approach are the low productivity and high cost of the vapor deposition process.

Patent Document 4 reports that the corrosion of a current-collecting substrate by a sulfonylimide electrolyte can be suppressed by providing on the current-collecting substrate a protective layer made of, for example, a noble metal, an alloy, a conductive ceramic, a semiconductor, an organic semiconductor or a conductive polymer.

In this case, formation of a protective layer made of a noble metal or the like requires the use of a low-productivity, high-cost process such as vapor deposition, whereas a protective layer made of a conductive polymer can be formed by a high-productivity, low-cost coating process.

However, because conductive polymers themselves have a low redox resistance and low thermochemical stability, when formed into a protective layer, a sufficient cell capacity loss-suppressing effect tends not to be obtained.

In light of such advantages and drawbacks of conductive polymers, as disclosed in Patent Document 5, one approach under investigation is that of forming a conductive protective layer having dispersed therein a conductive carbon material of high thermal stability, high chemical stability and low cost.

However, it has been disclosed that, in conductive protective layers which use conductive carbon or graphite, because corrosion of the aluminum current-collecting substrate cannot be adequately suppressed, it is necessary to use also an additive such as LiBOB, LiFOB or $LiPF_6$ which suppresses corrosion by forming a nonconductor film on top of the current-collecting substrate. In cases where such an additive that forms a nonconductor film on the current-collecting substrate is used, because the nonconductor film—which is a resistor—gradually grows with repeated charging and discharging, the resistance at the interface between the current-collecting substrate and the active material increases and the output characteristics of the cell decline.

Lithium iron phosphate ($LiFePO_4$) is highly promising as a next-generation positive electrode active material because it has an excellent thermal stability, a large theoretical capacity of 170 mAh/g, and the lithium insertion-extraction reaction proceeds at a high potential of about 3.4 V (vs. $Li/Li^+$).

However, it is known that lithium ion secondary cells in which $LiFePO_4$ is used as the positive electrode active material tend to be unable to exhibit sufficient cycle characteristics.

PRIOR ART DOCUMENTS

Patent Documents

Patent Document 1: JP-AH11-185807
Patent Document 2: JP-A H06-231754
Patent Document 3: WO 2012/093616
Patent Document 4: JP-A 2002-203562
Patent Document 5: JP-A 2013-546137

SUMMARY OF INVENTION

Technical Problem

The present invention was arrived at in light of the above circumstances. An object of the invention is to provide a nonaqueous secondary cell which, in spite of using a sulfonylimide electrolyte-containing nonaqueous electrolyte solution, has good cycle characteristics and high output characteristics.

Solution to Problem

In the course of extensive investigations aimed at achieving the above object, the inventors have discovered that by forming on the surface of a current-collecting substrate a dense electrically conductive protective layer having dispersed therein a conductive carbon material such as carbon nanotubes or carbon black, corrosion of the current-collecting substrate can be suppressed even when a sulfonylimide electrolyte-containing nonaqueous electrolyte solution is used, thus making it possible to obtain a secondary cell which has excellent cycle characteristics and moreover is able to greatly suppress capacity loss during rapid discharge.

Accordingly, the invention provides:
1. A nonaqueous secondary cell which includes a positive electrode having a positive electrode current-collecting substrate and, formed on top thereof, a positive electrode active material layer capable of intercalating and deintercalating lithium, a negative electrode having a negative electrode current-collecting substrate and, formed on top thereof, a negative electrode active material layer capable of intercalating and deintercalating lithium, a separator interposed between the positive and electrode electrodes, and a nonaqueous electrolyte solution, wherein the nonaqueous electrolyte solution includes a sulfonylimide electrolyte and a nonaqueous organic solvent, and an electrically conductive protective layer composed of an electrically conductive carbon material dispersed in a binder resin is formed on a surface of one or both of the positive electrode current-collecting substrate and the negative electrode current-collecting substrate;
2. The nonaqueous secondary cell of 1 above, wherein the conductive protective layer is formed on the surface of the positive electrode current-collecting substrate;
3. The nonaqueous secondary cell of 1 or 2 above, wherein the positive electrode active material layer includes lithium iron phosphate as the positive electrode active material;
4. The nonaqueous secondary cell of any of 1 to 3 above, wherein the conductive carbon material is at least one selected from the group consisting of carbon nanotubes and carbon black;
5. The nonaqueous secondary cell of any of 1 to 3 above, wherein the sulfonylimide electrolyte is lithium bis(fluorosulfonyl)imide;
6. The nonaqueous secondary cell of 5 above, wherein the nonaqueous organic solvent is an aprotic polar solvent and the lithium bis(fluorosulfonyl)imide is dissolved in the aprotic polar solvent;
7. The nonaqueous secondary cell of any of 1 to 6 above, wherein one or both of the positive electrode current-collecting substrate and the negative electrode current-collecting substrate include aluminum;
8. The nonaqueous secondary cell of any of 1 to 7 above, wherein the positive electrode current-collecting substrate is aluminum foil;
9. The nonaqueous secondary cell of any of 1 to 8 above, wherein the conductive protective layer has a thickness of from 0.001 to 1 μm;
10. The nonaqueous secondary cell of any of 1 to 9 above, wherein the binder resin includes an acidic polymer; and
11. The nonaqueous secondary cell of 10 above, wherein the acidic polymer has a carboxyl group or a sulfo group.

Advantageous Effects of Invention

The nonaqueous secondary cell of the invention, owing to the action of the electrically conductive protective layer, suppresses corrosion of the current-collecting substrate even in cases where a highly corrosive sulfonylimide electrolyte is used. As a result, because a sulfonylimide electrolyte can be safely utilized, the loss of capacity during rapid discharge is greatly suppressed, providing the secondary cell with good cycle characteristics.

The nonaqueous secondary cell of the invention which is endowed with such characteristics, in addition to having a long cycle life, also has the advantage that, in applications where there is a need for a large instantaneous current flow, current can be drawn without causing a voltage drop.

DESCRIPTION OF EMBODIMENTS

The invention is described below in greater detail.
The nonaqueous secondary cell of the invention includes: a positive electrode having a positive electrode current-collecting substrate and, formed on top thereof, a positive electrode active material layer capable of intercalating and deintercalating lithium; a negative electrode having a negative electrode current-collecting substrate and, formed on top thereof, a negative electrode active material layer capable of intercalating and deintercalating lithium; a separator interposed between the positive and electrode electrodes; and a nonaqueous electrolyte solution. The nonaqueous electrolyte solution includes a sulfonylimide electrolyte and a nonaqueous organic solvent. An electrically conductive protective layer made of an electrically conductive carbon material dispersed in a binder resin is formed on a surface of one or both of the positive electrode current-collecting substrate and the negative electrode current-collecting substrate.

The nonaqueous secondary cell in this invention is exemplified by lithium-based secondary cells such as lithium secondary cells and lithium ion secondary cells.

The conductive protective layer used in this invention includes a conductive carbon material that has a high thermal stability, a high chemical stability and a low cost.

This conductive carbon material is not particularly limited, although fibrous conductive carbon materials, layered conductive carbon materials and particulate conductive carbon materials are preferred. These conductive carbon materials may each be used singly, or two or more may be used in admixture.

Specific examples of fibrous conductive carbon materials include carbon nanotubes (CNTs) and carbon nanofibers (CNFs). From the standpoint of, for example, electrical conductivity, dispersibility and availability, carbon nanotubes are preferred.

Carbon nanotubes are generally produced by an arc discharge process, chemical vapor deposition (CVD), laser ablation or the like. The CNTs used in this invention may be obtained by any of these methods. CNTs are categorized as single-walled CNTs consisting of a single cylindrically rolled graphene sheet (abbreviated below as "SWCNTs"), double-walled CNTs consisting of two concentrically rolled graphene sheets (abbreviated below as "DWCNTs"), and multi-walled CNTs consisting of a plurality of concentrically rolled graphene sheets (MWCNTs). SWCNTs, DWCNTs or MWCNTs may be used alone in the invention, or a plurality of these types of CNTs may be used in combination.

When SWCNTs, DWCNTs or MWCNTs are produced by the above methods, catalyst metals such as nickel, iron, cobalt or yttrium may remain in the product, and so purification to remove these impurities is sometimes necessary. Acid treatment with nitric acid, sulfuric acid or the like and ultrasonic treatment are effective for the removal of impurities. However, in acid treatment with nitric acid, sulfuric acid or the like, there is a possibility of the π-conjugated system making up the CNTs being destroyed and the properties inherent to the CNTs being lost. It is thus desirable for the CNTs to be purified and used under suitable conditions.

Specific examples of layered conductive carbon materials include graphite and graphene. The graphite is not particularly limited; use can be made of various types of commercial graphites.

Graphene is a sheet of sp2-bonded carbon atoms that is one atom thick, and assumes a honeycomb-like hexagonal lattice structure made up of carbon atoms and their bonds. The thickness is said to be about 0.38 nm. Aside from commercial oxidized graphene, use can be made of oxidized graphene obtained by using Hummers' method to treat graphite.

Specific examples of particulate conductive carbon materials include carbon blacks such as furnace black, channel black, acetylene black and thermal black. Carbon black is not particularly limited; use can be made of various types of commercial carbon black. The particle size is preferably from 5 to 500 nm.

In terms of being able to form an electrically conductive protective layer that is thin and dense, the conductive carbon material used in this invention is preferably one having a small primary particle size, with CNT and carbon black being preferred, and CNT being more preferred.

The binder resin making up the conductive protective layer, from the standpoint of forming a highly dense conductive protective layer, is preferably one which has the ability to disperse the conductive carbon material. Moreover, because the conductive protective layer is situated between the current-collecting substrate and the active material layer, to increase the binding strength therebetween, a binder resin having a high adherence to the current-collecting substrate is preferred; also, a binder resin that does not dissolve in the electrolyte solution is preferred.

Illustrative examples of such binder resins include the following thermoplastic resins: fluororesins such as polyvinylidene fluoride (PVdF), polytetrafluoroethylene, tetrafluoroethylene-hexafluoropropylene copolymers, vinylidene fluoride-hexafluoropropylene copolymers (P(VDF-HFP)) and vinylidene fluoride-chlorotrifluoroethylene copolymers (P(VDF-CTFE)), polyvinylpyrrolidone, polyolefin resins such as ethylene-propylene-diene ternary copolymers, the vinyl polymers having oxazoline groups on side chains mentioned in WO 2015/029949 (oxazoline group-containing polymers), polyethylene (PE), polypropylene (PP), ethylene-vinyl acetate copolymers (EVA) and ethylene-ethyl acrylate copolymers (EEA), polystyrene resins such as polystyrene (PS), high-impact polystyrene (HIPS), acrylonitrile-styrene copolymers (AS), acrylonitrile-butadiene-styrene copolymers (ABS), methyl methacrylate-styrene copolymers (MS), styrene-butadiene rubbers and polystyrene sulfonic acid, polycarbonate resins, vinyl chloride resins, polyamide resins, polyimide resins, (meth)acrylic resins such as polyacrylic acid and polymethyl methacrylate (PMMA), polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate, polyphenylene ether resins, modified polyphenylene ether resins, polyacetal resins, polysulfone resins, polyphenylene sulfide resins, polyvinyl alcohol resins, polyglycolic acids, modified starches, cellulose acetate, carboxymethylcellulose, cellulose triacetate, chitin, chitosan, and lignin; and the following thermoset or photocurable resins: electrically conductive polymers such as polyaniline, emeraldine base (the semi-oxidized form of polyaniline), polythiophene, polypyrrole, polyphenylene vinylene, polyphenylene and polyacetylene, the triarylamine-based highly branched polymers mentioned in WO 2014/04280, epoxy resins, urethane acrylate, phenolic resins, melamine resins, urea resins, and alkyd resins. These may be used singly, or two or more may be used in admixture.

Of these, taking into consideration the dispersibility of the conductive carbon material and to increase adherence to the current-collecting substrate, a resin containing at least 10 wt % of oxygen atoms is preferred. An acidic polymer containing at least 10 wt % of oxygen atoms, or the organic salt or inorganic salt of an acidic polymer that generates an acidic polymer under the influence of heat is more preferred.

In particular, an acidic polymer containing a carboxylic acid group and/or a sulfo group, or an organic salt or inorganic salt thereof, is even more preferred. Specific preferred examples include polystyrene sulfonic acid, polyacrylic acid, alginic acid, and the sulfonic group-containing triarylamine-based highly branched polymers and ammonium salts thereof mentioned in WO 2014/04280.

Moreover, because the conductive protective layer used in this invention, as will be subsequently described, is preferably formed by coating a composition that uses water as the solvent onto the current-collecting substrate, preferred examples of the binder resin include ones that are water-soluble, such as polystyrene sulfonic acid, polyacrylic acid, alginic acid, oxazoline group-containing polymers, water-soluble cellulose, polyvinyl alcohol and organic salts or inorganic salts of these. Polystyrene sulfonic acid, polyacrylic acid, oxazoline group-containing polymers, water-soluble cellulose resins, and organic salts or inorganic salts of these are more preferred.

The binder resin may be acquired as a commercial product. Illustrative examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), the Metolose SH Series (hydroxypropylmethyl cellulose, from Shin-Etsu Chemical Co., Ltd.), the Metolose SE Series (hydroxyethylmethyl cellulose, from Shin-Etsu Chemical Co., Ltd.), JC-25 (a fully saponified polyvinyl alcohol, from Japan Vam & Poval Co., Ltd.), JM-17 (an intermediately saponified polyvinyl alcohol, from Japan Vam & Poval Co., Ltd.), JP-03 (a partially saponified polyvinyl alcohol, from Japan Vam & Poval Co., Ltd.), polystyrenesulfonic acid (from Aldrich Co.; solids concentration, 18 wt %; aqueous solution), and the following oxazoline group-containing polymers: Epocros WS-300 (from Nippon Shokubai Co., Ltd.; solids concentration, 10 wt %; aqueous solution), Epocros WS-700 (Nippon Shokubai Co., Ltd.; solids concentration, 25 wt %; aqueous solution), Epocros WS-500 (Nippon Shokubai Co., Ltd.; solids concentration, 39 wt %; water/1-methoxy-2-propanol solution), Poly(2-ethyl-2-oxazoline) (Aldrich), Poly(2-ethyl-2-oxazoline) (Alfa Aesar), and Poly(2-ethyl-2-oxazoline) (VWR International, LLC).

When commercially available as a solution, the solution may be used directly as is or may be used after replacing the solvent with a target solvent.

The electrically conductive protective layer used in the invention may be created using a conductive protective layer-forming composition (dispersion) containing a conductive carbon material, a binder resin and a solvent.

Illustrative examples of the solvent include water and the following organic solvents: ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These solvents may be used singly, or two or more may be used in admixture.

In terms of being able to increase the proportion of conductive carbon material that is individually dispersed, water, NMP, DMF, THF, methanol and isopropanol are especially preferred. Depending on the solvent used, it is desirable to include also a small amount of an additive that can increase the film formability of the composition, examples of which include glycol ethers such as ethylene glycol monoethyl ether, ethylene glycol monobutyl ether and propylene glycol monomethyl ether; ketones such as acetone, methyl ethyl ketone and cyclohexanone; and propylene glycol, isopropanol and NMP.

In recent years, owing to the trend away from organic solvents, there is a desire for materials which use water as the solvent. Hence, in the conductive protective layer-forming composition of the invention as well, it is preferable to use a mixed solvent of a hydrophilic solvent and water or to use water alone as the solvent, with the use of water alone as the solvent being most preferred.

Any suitable method may be used to prepare this composition (dispersion). The conductive carbon material, binder resin and solvent may be mixed together in any order.

At this time, it is preferable to subject a mixture of the binder resin, the conductive carbon material and the solvent to dispersion treatment; such treatment enables the dispersed proportion of the conductive carbon material to be further increased. Dispersion treatment is exemplified by mechanical treatment that entails wet treatment using a ball mill, bead mill or jet mill or ultrasonic treatment using a bath-type or probe-type sonicator.

The mixing ratio of binder resin and conductive carbon material in the composition (dispersion) is not limited so long as a dense protective layer can be formed. In this invention, the mixing ratio may be set to a weight ratio of from about 100:1 to about 1:100.

The concentration of binder resin in the composition (dispersion) is not particularly limited, so long as it is a concentration that enables the conductive carbon material to be dispersed in the solvent. In the invention, the concentration of binder resin in the dispersion is preferably set to not more than 30 wt %, and more preferably set to not more than 20 wt %.

In addition, the concentration of conductive carbon material in the composition (dispersion) is not limited so long as at least some of the conductive carbon material is individually dispersed. In the invention, the concentration of conductive carbon material in the dispersion is set to preferably not more than 30 wt %, more preferably not more than 20 wt %, and even more preferably not more than 10 wt %.

The composition (dispersion) may also include an additional binder resin that is soluble in the above-mentioned solvent, and a crosslinking agent. Any of the above-mentioned binder resins may be used as the additional binder resin.

The crosslinking agent may be either a compound that gives rise to a crosslinking reaction with the binder resin or a compound that is self-crosslinking. However, in terms of further increasing the solvent resistance of the thin film to be obtained, a crosslinking agent that reacts with the binder resin to form a crosslinked structure is preferred.

Examples of crosslinking agents that react with the binder resin to form a crosslinked structure include compounds having a crosslinkable functional group that can react with a functional group on the binder resin to form a crosslinked structure, such as an aldehyde group, epoxy group, vinyl group, isocyanate group or alkoxy group that can react with a hydroxyl group, an aldehyde group, amino group, isocyanate group or epoxy group that can react with a carboxyl group, a carboxyl group, ammonium carboxylate, hydroxyl group, thiol group, amino group, sulfinic acid group or epoxy group that can react with an oxazoline group, or an isocyanate group or aldehyde group that can react with an amino group; and compounds that have the same functional group as the functional group on the binder resin, which functional groups react with one another, such as hydroxyl groups (dehydration condensation), mercapto groups (disulfide bonding), ester groups (Claisen condensation), silanol groups (dehydration condensation), vinyl groups and acrylic groups. These may be used singly, or two or more may be used in combination.

For example, crosslinking agents for triarylamine-based highly branched polymers are exemplified by melamine crosslinking agents, substituted urea crosslinking agents, and crosslinking agents which are polymers thereof. These crosslinking agents may be used singly, or two or more may be used in admixture. A crosslinking agent having at least two crosslink-forming substituents is preferred. Illustrative examples of such crosslinking agents include compounds such as CYMEL®, methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, butoxymethylated thiourea and methylolated thiourea, as well as condensates of these compounds.

Crosslinking agents for oxazoline polymers are not particularly limited, provided they are compounds having two or more functional groups that react with oxazoline groups, such as carboxyl, hydroxyl, thiol, amino, sulfinic acid and epoxy groups. Compounds having two or more carboxyl groups are preferred. Compounds having functional groups such as the sodium, potassium, lithium or ammonium salts of carboxylic acids that, under heating during thin-film formation or in the presence of an acid catalyst, generate the above functional groups and give rise to crosslinking reactions, may also be used as the crosslinking agent.

Examples of compounds which give rise to crosslinking reactions with oxazoline groups include the metal salts of synthetic polymers such as polyacrylic acid and copolymers thereof or of natural polymers such as carboxymethylcellulose or alginic acid which give rise to crosslink reactivity in the presence of an acid catalyst, and ammonium salts of these same synthetic polymers and natural polymers which give rise to crosslink reactivity under heating. Sodium polyacrylate, lithium polyacrylate, ammonium polyacrylate, carboxymethylcellulose sodium, carboxymethylcellulose lithium and carboxymethylcellulose ammonium, which give rise to crosslink reactivity in the presence of an acid catalyst or under heating conditions, are especially preferred.

These compounds that give rise to crosslinking reactions with oxazoline groups may be acquired as commercial products. Examples of such commercial products include sodium polyacrylate (Wako Pure Chemical Industries Co., Ltd.; degree of polymerization, 2,700 to 7,500), carboxymethylcellulose sodium (Wako Pure Chemical Industries, Ltd.), sodium alginate (Kanto Chemical Co., Ltd.; extra pure reagent), Aron A-30 (ammonium polyacrylate, from Toagosei Co., Ltd.; solids concentration, 32 wt %; aqueous solution), DN-800H (carboxymethylcellulose ammonium, from Daicel FineChem, Ltd.), and ammonium alginate (Kimica Corporation).

Examples of crosslinking agents that are self-crosslinking include compounds having, on the same molecule, crosslinkable functional groups which react with one another, such as a hydroxyl group with an aldehyde group, epoxy group, vinyl group, isocyanate group or alkoxy group; a carboxyl group with an aldehyde group, amino group, isocyanate group or epoxy group; or an amino group with an isocyanate group or aldehyde group; and compounds having like crosslinkable functional groups which react with one another, such as hydroxyl groups (dehydration condensation), mercapto groups (disulfide bonding), ester groups (Claisen condensation), silanol groups (dehydration condensation), vinyl groups and acrylic groups.

Specific examples of crosslinking agents that are self-crosslinking include any of the following which exhibit crosslink reactivity in the presence of an acid catalyst: polyfunctional acrylates, tetraalkoxysilanes, and block copolymers of a blocked isocyanate group-containing monomer and a monomer having at least one hydroxyl, carboxyl or amino group.

Such crosslinking agents that are self-crosslinking may be acquired as commercial products. Examples of such commercial products include polyfunctional acrylates such as A-9300 (ethoxylated isocyanuric acid triacrylate, from Shin-Nakamura Chemical Co., Ltd.), A-GLY-9E (ethoxylated glycerine triacrylate (EO 9 mol), from Shin-Nakamura Chemical Co., Ltd.) and A-TMMT (pentaerythritol tetraacrylate, from Shin-Nakamura Chemical Co., Ltd.); tetraalkoxysilanes such as tetramethoxysilane (Tokyo Chemical Industry Co., Ltd.) and tetraethoxysilane (Toyoko Kagaku Co., Ltd.); and blocked isocyanate group-containing polymers such as the Elastron Series E-37, H-3, H38, BAP, NEWBAP-15, C-52, F-29, W-11P, MF-9 and MF-25K (DKS Co., Ltd.).

In addition, an acidic compound such as p-toluenesulfonic acid, trifluoromethanesulfonic acid, pyridinium p-toluenesulfonate, salicylic acid, sulfosalicylic acid, citric acid, benzoic acid, hydroxybenzoic acid or naphthalenecarboxylic acid and/or a thermal acid generator such as 2,4,4,6-tetrabromocyclohexadienone, benzoin tosylate, 2-nitrobenzyl tosylate or an organic alkyl sulfonate may be added to the composition (dispersion) as a catalyst for accelerating the crosslinking reaction.

When using a crosslinking agent or the like, the composition (dispersion) may be prepared by mechanical treatment, entailing wet treatment using a ball mill, bead mill or jet mill or ultrasonic treatment using a bath-type or probe-type sonicator, of a mixture of at least the conductive carbon material, the binder resin and the solvent, followed by the addition thereto of the crosslinking agent and, if necessary, additional binder resin and catalyst.

It is also possible to add the additional binder resin, crosslinking agent and catalyst prior to carrying out the aforementioned mechanical treatment.

In this invention, it is preferable to apply the composition (dispersion) described above onto at least the side of the current-collecting substrate where the active material layer is to be formed, and then air dry or dry under applied heat the applied composition so as to form an electrically conductive protective layer, thereby creating a composite current-collecting substrate consisting of a current-collecting substrate and a conductive protective layer.

The current-collecting substrate may be suitably selected from among those hitherto used as electrode current-collecting substrates in nonaqueous secondary cells. For example, use can be made of thin films of copper, aluminum, nickel, gold, silver and alloys thereof, and of carbon materials, metal oxides and conductive polymers. It is preferable for at least one of the positive electrode current-collecting substrate and the negative electrode current-collecting substrate to include aluminum, more preferable for the positive electrode current-collecting substrate to include aluminum, and even more preferable for the positive electrode current-collecting substrate to be aluminum foil.

The thickness of the current-collecting substrate is not particularly limited, although a thickness of from 1 to 100 µm is preferred in this invention.

The thickness of the conductive protective layer also is not particularly limited. However, taking into account the decrease in internal resistance, the thickness is preferably from 0.001 to 1 µm, more preferably from 0.01 to 0.8 µm, and even more preferably from 0.03 to 0.5 µm.

Examples of the method for applying the composition (dispersion) include spin coating, dip coating, flow coating, inkjet coating, spray coating, bar coating, gravure coating, slit coating, roll coating, flexographic printing, transfer printing, brush coating, blade coating and knife coating. From the standpoint of work efficiency and other considerations, gravure coating, slit coating and knife coating are preferred.

The temperature during drying under applied heat, although not particularly limited, is preferably from about 50° C. to about 200° C., and more preferably from about 80° C. to about 150° C.

One or both of the positive and negative electrodes used in the invention can be produced by forming an active material layer on the conductive protective layer.

The active material used here may be any of the various types of active materials that have hitherto been used in the electrodes of lithium-based secondary cells.

For example, chalcogen compounds capable of intercalating and deintercalating lithium ions, lithium ion-containing chalcogen compounds, polyanion compounds, elemental sulfur and sulfur compounds may be used as the positive electrode active material.

Illustrative examples of such chalcogen compounds capable of intercalating and deintercalating lithium ions include $FeS_2$, $TiS_2$, $MoS_2$, $V_2O_6$, $V_6O_{13}$ and $MnO_2$.

Illustrative examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_2$ (wherein M is one or more metal element selected from cobalt, manganese, titanium, chromium, vanadium, aluminum, tin, lead and zinc; and the conditions $0.05 \leq x \leq 1.10$ and $0.5 \leq y \leq 1.0$ are satisfied).

An example of a polyanion compound is lithium iron phosphate ($LiFePO_4$).

Illustrative examples of sulfur compounds include $Li_2S$ and rubeanic acid.

Of these, it is preferable to use a $LiFePO_4$-containing positive electrode active material in the nonaqueous secondary cell of the invention.

The following may be used as the negative electrode active material making up the negative electrode: alkali metals, alkali alloys, at least one elemental substance selected from among group 4 to 15 elements of the periodic table which intercalate and deintercalate lithium ions, as well as oxides, sulfides and nitrides thereof, and carbon materials which are capable of reversibly intercalating and deintercalating lithium ions.

Illustrative examples of the alkali metals include lithium, sodium and potassium. Illustrative examples of the alkali metal alloys include metallic lithium, Li—Al, Li—Mg, Li—Al—Ni, sodium, Na—Hg and Na—Zn.

Illustrative examples of the at least one elemental substance selected from among group 4 to 15 elements of the periodic table which intercalate and deintercalate lithium ions include silicon, tin, aluminum, zinc and arsenic.

Illustrative examples of the oxides include tin silicon oxide ($SnSiO_3$), lithium bismuth oxide ($Li_3BiO_4$), lithium zinc oxide ($Li_2ZnO_2$) and lithium titanium oxide ($Li_4Ti_5O_{12}$).

Illustrative examples of the sulfides include lithium iron sulfides ($Li_xFeS_2$ ($0 \leq x \leq 3$)) and lithium copper sulfides ($Li_xCuS$ ($0 \leq x \leq 3$)).

Exemplary nitrides include lithium-containing transition metal nitrides, illustrative examples of which include $Li_xM_yN$ (wherein M is cobalt, nickel or copper; $0 \leq x \leq 3$, and $0 \leq y \leq 0.5$) and lithium iron nitride ($Li_3FeN_4$).

Examples of carbon materials which are capable of reversibly intercalating and deintercalating lithium ions include graphite, carbon black, coke, glassy carbon, carbon fibers, carbon nanotubes, and sintered compacts of these.

Aside from the active material, a conductive additive may also be added to the electrodes used in the invention. Illustrative examples of conductive additives include carbon black, ketjen black, acetylene black, carbon whiskers, carbon nanotubes, carbon fibers, natural graphite, synthetic graphite, titanium oxide, ruthenium oxide, aluminum and nickel.

The active material layer may be formed by, for example, coating an electrode slurry containing the above-described active material, binder resin and, optionally, a solvent onto the conductive protective layer and then drying the slurry in air or under heating.

A known material may be suitably selected and used as the binder resin. Illustrative examples include electrically conductive polymers such as polyvinylidene fluoride (PVdF), polyvinylpyrrolidone, polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohols, polyimides, ethylene-propylene-diene ternary copolymers, styrene-butadiene rubbers, carboxymethylcellulose (CMC), polyacrylic acid (PAA) and polyaniline.

The amount of binder resin added per 100 parts by weight of the active material is preferably from 0.1 to 20 parts by weight, and more preferably from 1 to 10 parts by weight.

The solvent is exemplified by the solvents mentioned above for the conductive protective layer-forming composition. The solvent may be suitably selected from among these according to the type of binder, although NMP is preferred in the case of water-insoluble binders such as PVdF, and water is preferred in the case of water-soluble binders such as PAA.

The method of applying the electrode slurry is exemplified by the same techniques as mentioned above for the conductive protective layer-forming composition.

The temperature when drying under applied heat, although not particularly limited, is preferably from about 50° C. to about 200° C., and more preferably from about 80° C. to about 150° C.

Illustrative examples of the separator that is interposed between the positive and negative electrodes include cellulose-based separators and polyolefin-based separators.

Also, in this invention, a sulfonylimide electrolyte is used as the nonaqueous electrolyte.

The sulfonylimide electrolyte is exemplified by lithium bis(trifluoromethanesulfonyl)imide, lithium bis(pentafluoroethanesulfonyl)imide and lithium bis(fluorosulfonyl)imide. Lithium bis(fluorosulfonyl)imide, which has an excellent ionic conductivity, thermal stability and chemical stability, is especially preferred.

In addition to the sulfonylimide electrolyte, other electrolytes used in lithium-based secondary cells may be concomitantly used.

Examples of such other electrolytes include lithium chloride, lithium bromide, lithium iodide, lithium tetrafluoroborate, lithium hexafluorophosphate, lithium perchlorate and lithium trifluoromethanesulfonate.

When such other electrolytes are used, it is preferable for the amount of sulfonylimide electrolyte to be more than 50 wt % of the overall electrolyte.

Examples of nonaqueous organic solvents that may be used together with the electrolyte include the following aprotic polar solvents: alkylene carbonates such as propylene carbonate, ethylene carbonate and butylene carbonate; dialkyl carbonates such as dimethyl carbonate, methyl ethyl carbonate and diethyl carbonate; nitriles such as acetonitrile; and amides such as dimethylformamide.

It is preferable for the sulfonylimide electrolyte to be uniformly dissolved in the nonaqueous electrolyte.

The configuration of the nonaqueous secondary cell of the invention is not particularly limited. Cells of various known configurations, such as cylindrical cells, flat wound prismatic cells, stacked prismatic cells, coin cells, flat wound laminate cells and stacked laminate cells may be used.

For example, a coin cell-type lithium ion secondary cell may be produced by setting a given number of pieces of lithium foil that have been die-cut to a specific shape on a coin cell cap to which a washer and a spacer have been welded, laying a sulfonylimide electrolyte-containing nonaqueous electrolyte solution-impregnated separator of the same shape on top of the foil, stacking the positive electrode on top of the separator with the active material layer facing down, placing the coin cell case and a gasket thereon and sealing the cell with a coin cell crimper. In this case, the lithium foil serves also as the negative electrode current-collecting substrate.

EXAMPLES

Working Examples and Comparative Examples are given below to more fully illustrate the invention, although the invention is not limited by these Examples. The instruments used in the Examples were as follows.

(1) GPC1
  Instrument: HLC-8220 GPC from Tosoh Corporation
  Columns: Shodex™ OHpak SB803-HQ and OHpak SB804-HQ
  Column temperature: 40° C.
  Solvent: Dimethylformamide/LiBr·H$_2$O (29.6 mM)/ H$_3$PO$_4$ (29.6 mM)/THF (0.1 wt %)
  Flow rate: 1.0 mL/min
  Detector: UV (254 nm)
  Calibration curve: Polystyrene standard
(2) GPC2
  Instrument: HLC-8220 GPC from Tosoh Corporation
  Columns: Shodex™ KF-804L and KF-805L
  Column temperature: 40° C.
  Solvent: Tetrahydrofuran
  Flow rate: 1.0 mL/min
  Detector: UV (254 nm)
  Calibration curve: Polystyrene standard
(3) Probe-type ultrasonicator (dispersion treatment):
  Instrument: UIP1000 (Hielscher Ultrasonics GmbH)
(4) Wire bar coater (thin-film production):
  Instrument: PM-9050MC (SMT Co., Ltd.)
(5) Select roller
  OSP-30, from Matsuo Sangyo Co., Ltd.
(6) Charge/discharge measurement system (evaluation of secondary cell):
  Instrument: HJ1001 SM8A (Hokuto Denko Corporation)
(7) Micrometer (measurement of binder and active material layer thicknesses):
  Instrument: IR54 (Mitutoyo Corporation)
(8) Homogenizing disperser (mixing of electrode slurry)
  Instrument: T. K. Robomix (with Homogenizing Disperser model 2.5 (32 mm dia.)), from Primix Corporation
(9) Thin-film spin-type high-speed mixer (mixing of electrode slurry)
  Instrument: Filmix model 40 (Primix Corporation)
(10) Roll press (compressing of electrode):
  Instrument: HSR-60150H ultra-small desktop hot roll press (Hohsen Corporation)

[1] Synthesis of Binder Resin

[Synthesis Example 1] Preparation of Polyamide Acid Solution p-Phenylenediamine (p-PDA), 20.161 g (187 mmol), and 12.206 g (47 mmol) of 4,4-diamino-p-terphenyl (DATP) were dissolved in 617.4 g of NMP. After cooling the resulting solution to 15° C., 50.112 g (230 mmol) of pyromellitic dianhydride (PMDA) was added and, in a nitrogen atmosphere, the temperature was raised to 50° C. and the reaction was carried out for 48 hours, giving a polyamide acid solution. The weight-average molecular weight (abbreviated below as "Mw") of the resulting polymer was measured under the GPC1 conditions, yielding a result of $8.2 \times 10^4$.

[Synthesis Example 2] Synthesis of the Highly Branched Polymer PTPA-PBA

Under nitrogen, a one-liter four-neck flask was charged with 80.1 g (326 mmol) of triphenylamine (Tokyo Chemical Industry Co., Ltd.), 119.0 g (653 mmol, 2.0 equivalents with respect to triphenylamine) of 4-phenylbenzaldehyde (Mitsubishi Gas Chemical Company, Inc.), 12.4 g (65 mmol, 0.2 equivalent with respect to triphenylamine) of p-toluenesulfonic acid monohydrate (Konan Chemical Manufacturing Co., Ltd.) and 160 g of 1,4-dioxane (Junsei Chemical Co., Ltd.). This mixture was raised to a temperature of 85° C. under stirring, bringing about dissolution and starting polymerization. After 6 hours of reaction, the reaction mixture was allowed to cool to 60° C. To this reaction mixture were added 560 g of THF and 80 g of 28 wt % ammonia water, and the resulting reaction solution was poured into a mixed solution of 2,000 g of acetone and 400 g of methanol, inducing re-precipitation. The precipitate that settled out was collected by filtration and then vacuum dried at 50° C. for 6 hours and at 130° C. for 10 hours, giving 115.1 g of the highly branched polymer PTPA-PBA having recurring units of formula [A] below.

The Mw of the resulting PTPA-PBA was measured under the GPC2 conditions, yielding a result of 16,700.

[Chem. 1]

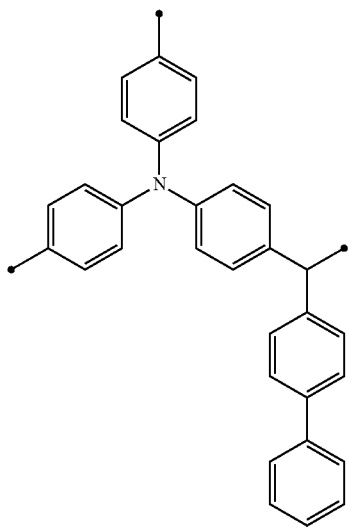

[A]

(The '•' symbols indicate bonding sites with neighboring recurring units.)

[Synthesis Example 3] Synthesis of the Highly Branched Polymer PTPA-PBA-SO$_3$H

Under nitrogen, a 500 mL four-neck flask was charged with 5.0 g of the PTPA-PBA obtained in Synthesis Example 2 and 50 g of sulfuric acid (Kanto Chemical Co., Inc.). This mixture was stirred at 25° C. for 1 hour, following which the temperature was raised to 40° C. and the mixture was stirred for 3 hours, bringing the sulfonation reaction to completion. This reaction mixture was poured into 250 g of deionized water, inducing re-precipitation, and stirred at 25° C. for 3 hours, following which it was vacuum-filtered and then rinsed by spraying with 50 g of deionized water, and the filtered matter was collected. The filtered matter was charged, together with 100 g of pure water, into a 200 mL four-neck flask and stirred at 25° C. for 3 hours, following which it was vacuum filtered and subsequently rinsed by spraying with 50 g of deionized water, and the filtered matter was collected. The filtered matter was charged one more time, together with 100 g of deionized water, into a 200 mL four-neck flask and stirred at 25° C. for 3 hours, following which it was vacuum filtered and then rinsed by spraying with 50 g of deionized water, and the filtered matter was collected. This filtered matter was vacuum dried at 80° C. for 9 hours, giving 5.8 g of the highly branched polymer PTPA-PBA-SO$_3$H having recurring units of formula [B] below (which polymer is referred to below simply as PTPA-PBA-SO$_3$H) as a violet powder.

The sulfur atom content of the PTPA-PBA-SO$_3$H calculated from sulfur quantitative analysis was 6.6 wt %. The sulfo group content of the PTPA-PBA-SO$_3$H as determined from this result was one per recurring unit of the highly branched polymer PTPA-PBA.

[Chem. 2]

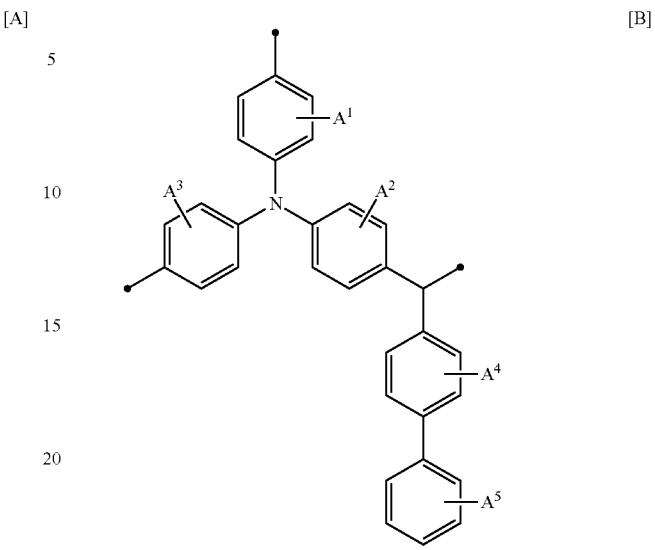

[B]

(The '•' symbols indicate bonding sites with neighboring recurring units; one of $A^1$ to $A^5$ is a sulfo group.)

[2] Preparation of Conductive Protective Layer-Forming Compositions

Production Example 1-1

The oxazoline group-containing polymer-containing aqueous solution Epocros WS-700 (from Nippon Shokubai Co., Ltd.; solids concentration, 25 wt %; Mw, 4×10$^4$; oxazoline group content, 4.5 mmol/g), 2.0 g, and 47.5 g of deionized water were mixed together, following which 0.5 g of multi-walled CNTs (NC7000, from Nanocyl) was mixed therein. The resulting mixture was ultrasonically treated for 30 minutes at room temperature using a probe-type ultrasonicator. Next, the solution obtained by dissolving 0.7 g of the ammonium polyacrylate (PAA-NH$_4$)-containing aqueous solution Aron A-30 (Toagosei Co., Ltd.; solids concentration, 31.6 wt %) and 6.7 g of a 3% aqueous solution of sodium alginate (Kanto Chemical Co., Ltd.) in 42.6 g of deionized water was mixed therein, giving Conductive Protective Layer-Forming Composition 1-1.

Production Example 1-2

Aside from using acetylene black (AB; available as Denka Black from Denka Co., Ltd.) instead of multiwalled CNTs (NC7000, from Nanocyl), Conductive Protective Layer-Forming Composition 1-2 was obtained in the same way as in Production Example 1-1.

Production Example 1-3

An aqueous solution of polystyrene sulfonic acid (from Aldrich Co.; solids concentration, 18 wt %; Mw, about 7.5×10$^4$), 2.78 g, and 46.72 g of deionized water were mixed together, and 0.5 g of multiwalled CNTs (NC7000, from Nanocyl) was mixed thereon. The resulting mixture was ultrasonically treated for 30 minutes at room temperature using a probe-type ultrasonicator, thereby giving Conductive Protective Layer-Forming Composition 1-3.

Production Example 1-4

Aside from using acetylene black (AB; Denka Black from Denka Co., Ltd.) instead of multiwalled CNTs (NC7000, from Nanocyl), Conductive Protective Layer-Forming Composition 1-4 was obtained in the same way as in Production Example 1-3.

Production Example 1-5

First, 4.24 g of the polyamide acid solution obtained in Synthesis Example 1 acid (solids concentration, 11.8 wt %; Mw, $8.2 \times 10^4$), 12.25 g of deionized water and 33.01 g of NMP were mixed together, and 0.5 g of multiwalled CNTs (NC7000, from Nanocyl) was mixed therein. The resulting mixture was ultrasonically treated for 30 minutes at room temperature using a probe-type ultrasonicator, thereby giving Conductive Protective Layer-Forming Composition 1-5.

Production Example 1-6

Aside from using acetylene black (AB; Denka Black from Denka Co., Ltd.) instead of multiwalled CNTs (NC7000, from Nanocyl), Conductive Protective Layer-Forming Composition 1-6 was obtained by the same way as in Production Example 1-5.

Production Example 1-7

First, 0.5 g of the PTPA-PBA-SO$_3$HO obtained in Synthesis Example 3, 41.5 g of 2-propanol (IPA) (Junsei Chemical Co., Ltd.) and 7.5 g of deionized water were mixed together, and 0.5 g of multiwalled CNTs (NC7000, from Nanocyl) was mixed thereon. The resulting mixture was ultrasonically treated for 30 minutes at room temperature using a probe-type ultrasonicator, following which the solution obtained by dissolving 3.88 g of the polyacrylic acid (PAA)-containing aqueous solution Aron A-10H (Toagosei Co., Ltd.; solids concentration, 25.7 wt %) in 46.1 g of deionized water was mixed therein, thereby giving Conductive Protective Layer-Forming Composition 1-7.

[3] Formation of Conductive Protective Layer
(Production of Composite Current-Collecting Substrate)

Production Example 2-1

Conductive Protective Layer-Forming Composition 1-1 obtained in Production Example 1-1 was uniformly spread onto aluminum foil (thickness, 20 μm) with a wire bar coater (select roller: OSP-30; wet film thickness, 30 μm) and then dried for 20 minutes at 150° C. to form a conductive protective layer (film thickness, 0.2 μm), thereby giving Composite Current-Collecting Substrate 2-1 in which aluminum foil and a conductive protective layer are arranged as successive layers.

Production Example 2-2

Aside from using Conductive Protective Layer-Forming Composition 1-2 instead of Conductive Protective Layer-Forming Composition 1-1, a conductive protective layer (film thickness, 0.2 μm) was formed by the same method as in Production Example 2-1, giving Composite Current-Collecting Substrate 2-2.

Production Examples 2-3 and 2-4

Aside from using, respectively, Conductive Protective Layer-Forming Compositions 1-3 and 1-4 instead of Conductive Protective Layer-Forming Composition 1-1, conductive protective layers (film thickness, 0.25 μm) were formed by the same method as in Production Example 2-1, giving Composite Current-Collecting Substrates 2-3 and 2-4.

Production Examples 2-5 and 2-6

Aside from using, respectively, Conductive Protective Layer-Forming Compositions 1-5 and 1-6 instead of Conductive Protective Layer-Forming Composition 1-1, drying at 150° C. for 20 minutes and then vacuum drying at 200° C. for 30 minutes, conductive protective layers (film thickness, 0.25 μm) were formed by the same method as in Production Example 2-1, giving Composite Current-Collecting Substrates 2-5 and 2-6.

Production Example 2-7

Aside from using Conductive Protective Layer-Forming Composition 1-7 instead of Conductive Protective Layer-Forming Composition 1-1, a conductive protective layer (film thickness, 0.25 μm) was formed by the same method as in Production Example 2-1, giving Composite Current-Collecting Substrate 2-7.

[4] Electrode Production

Production Example 3-1

Lithium iron phosphate (LFP; available from Tatung Fine Chemicals Co; 17.3 g) as the active material, an NMP solution of PVdF (12 wt %; 12.8 g) as the binder, acetylene black (AB; available as Denka Black from Denka Co., Ltd.; 0.384 g) as the conductive additive and NMP (9.54 g) were mixed together and then treated at 3,500 rpm for 1 minute using a T.K. Robomix (with Homogenizing Disperser model 2.5 (32 mm dia.), from Primix Corporation). The mixture was then subjected to mixing treatment using a thin-film spin-type high-speed mixer (Filmix model 40, from Primix Corporation) at a peripheral speed of 20 m/s for 60 seconds, thereby producing an electrode slurry (solids concentration, 48 wt %; LFP:PVdF:AB=90:8:2 (weight ratio)).

The electrode slurry thus prepared was uniformly spread (wet film thickness, 200 μm (film thickness after drying, 55 μm)) by the doctor blade method onto Composite Current-Collecting Substrate 2-1 produced in Production Example 2-1 and subsequently dried, first at 80° C. for 30 minutes, then at 120° C. for 30 minutes, to form an active material layer on the conductive protective layer. This was pressure-bonded with a roll press, thereby producing Electrode 3-1.

Production Examples 3-2 to 3-7

Aside from using, respectively, Composite Current-Collecting Substrates 2-2 to 2-7 instead of Composite Current-Collecting Substrate 2-1, Electrodes 3-2 to 3-7 were produced in the same way as in Production Example 3-1.

Comparative Production Example 3-1

Aside from using aluminum foil (thickness, 20 μm) alone as the current-collecting substrate instead of Composite Current-Collecting Substrate 2-1, an electrode was produced in the same way as in Production Example 3-1.

[5] Production of Lithium Ion Cells

Working Example 1-1

Electrode 3-1 obtained in Production Example 3-1 was die-cut in the shape of a 10 mm diameter disk and the weight was measured, following which the electrode disk was vacuum-dried at 100° C. for 15 hours and then transferred to a glovebox filled with argon. A gasket was placed on a 2032 coin cell (Hohsen Corporation) cap to which a washer and a spacer had been welded, following which a stack of six pieces of lithium foil (Honjo Chemical Corporation; thickness, 0.17 mm) that had been die-cut to a diameter of 14 mm was set thereon, and one piece of separator (Celgard 2400) die-cut to a diameter of 16 mm that had been permeated for at least 24 hours with Electrolyte Solution A (Tomiyama Pure Chemical Industries, Ltd.; composed of 1 mol of LiFSl dissolved in 1 liter of ethylene carbonate:diethyl carbonate=3:7 (volume ratio)) was placed on the foil. The Electrode 3-1 that was die-cut in the shape of a disk was then placed on top thereof with the active material-coated side facing down. One drop of Electrolyte Solution A was deposited thereon, after which the coin cell case was placed on top and sealing was carried out with a coin cell crimper. The cell was subsequently placed at rest for 24 hours, giving a secondary cell.

Working Examples 1-2 to 1-7

Aside from using Electrodes 3-2 to 3-7 instead of Electrode 3-1, secondary cells were produced in the same way as in Working Example 1-1.

Comparative Example 1-1

Aside from using Electrolyte Solution B (Kishida Chemical Co., Ltd.; containing 1 mol/L of the electrolyte lithium hexafluorophosphate in ethylene carbonate:diethyl carbonate=1:1 (volume ratio)) instead of Electrolyte Solution A, a secondary cell was produced in the same way as in Working Example 1-1.

Comparative Examples 1-2 to 1-7

Aside from using Electrolyte B used in Comparative Example 1-1 instead of Electrolyte A, secondary cells were produced in the same way as in Working Examples 1-2 to 1-7.

Comparative Example 1-8

Aside from using the electrode produced in Comparative Production Example 3-1 instead of Electrode 3-1, a secondary cell was produced in the same way as in Working Example 1-1.

(1) Evaluation of Secondary Cell Characteristics (1)

The characteristics of the secondary cells produced in Working Example 1-1 and Comparative Example 1-8 were evaluated. Charge-discharge tests were carried out under the following conditions for the purpose of evaluating whether the deterioration in capacity due to corrosion of the current-conducting substrates by a sulfonylimide electrolyte can be suppressed by a conductive protective layer. Table 1 shows the initial discharge capacity and the percent retention of capacity following the cycle characteristics test.

[Charge-Discharge Test Conditions]
  Current: 0.5 C constant-current charging and discharging (the capacity of LFP is 170 mAh/g)
  Cut-off voltage: 4.50 V-2.00 V
  Temperature: room temperature
  Initial discharge capacity: discharge capacity (mAh/g) in $5^{th}$ cycle Percent capacity retention after cycle characteristics test:

(discharge capacity (mAh/g) in $100^{th}$ cycle÷discharge capacity (mAh/g) in $5^{th}$ cycle)×100

TABLE 1

| | Electrolyte | Conductive material | Binder resin, Crosslinking agent, Catalyst | Discharge capacity (mAh/g) | Capacity retention (%) |
|---|---|---|---|---|---|
| Working Example 1-1 | LiFSl | CNT | WS-700, PAA-NH$_4$, Na alginate | 150 | 100 |
| Comparative Example 1-8 | LiFSl | — | — | 146 | 13 |

As shown in Table 1, the cells produced in Working Example 1-1 and Comparative Example 1-8 had similar discharge capacities in the $5^{th}$ cycle. However, in the $100^{th}$ cycle, the cell in Comparative Example 1-8 had a low capacity retention due to a pronounced deterioration in capacity, whereas the cell in Working Example 1-1 had a capacity retention of 100% with no observable deterioration in capacity.

The reason appears to be that when a sulfonylimide electrolyte was used in the cell in Comparative Example 1-8, even after only 100 charge-discharge cycles, the secondary cell exhibited an increase in resistance and a deterioration in capacity due to severe corrosion of the current-collecting substrates. By contrast, in the cell in Working Example 1-1, corrosion of the current-collecting substrates was suppressed by the conductive protective layer, resulting in a dramatic improvement in the stability of the secondary cell.

This demonstrates that corrosion of the current-collecting substrates by a sulfonylimide electrolyte can be suppressed by a conductive protective layer, enabling the production of secondary cells having high cycle characteristics and a good safety.

(2) Evaluation of Secondary Cell Characteristics (2)

Next, the characteristics of the secondary cells produced in Working Examples 1-1 to 1-7 and Comparative Examples 1-1 to 1-8 were evaluated.

Specifically, charge-discharge tests were carried out under the following conditions for the purpose of evaluating whether the deterioration in capacity due to corrosion of the current-conducting substrates by a sulfonylimide electrolyte can be suppressed by a conductive protective layer, and also to evaluate the influence on the capacity and output characteristics of secondary cells by a sulfonylimide electrolyte which exhibits high thermal stability, chemical stability and mobility. Table 2 shows the discharge capacity at a discharge rate of 10 C and the percent charge retention after the cycle characteristics test at a discharge rate of 5 C.

[Charge-Discharge Test Conditions]
  Current: 0.5 C constant-current charging, constant-current discharging for 5 cycles each in the order 0.5 C, 3 C, 5 C, 10 C and 0.5 C (the capacity of LFP is 170 mAh/g), followed by constant-current discharging at 5 C until the $300^{th}$ cycle
  Cut-off voltage: 4.50 V-2.00 V
  Temperature: room temperature
  Discharge capacity at discharge rate of 10 C: discharge capacity (mAh/g) in $18^{th}$ cycle
  Percent discharge retention after cycle characteristics test at discharge rate of 5 C:

(discharge capacity (mAh/g) in $300^{th}$ cycle÷initial discharge capacity at 5 C (in $13^{th}$ cycle, mAh/g))×100

TABLE 2

|  |  | Electrolyte | Conductive material | Binder resin, Crosslinking agent, Catalyst | Discharge capacity (mAh/g) | Capacity retention (%) |
|---|---|---|---|---|---|---|
| Working Example | 1-1 | LiFSl | CNT | WS-700, PAA-NH$_4$, Na alginate | 94 | 104 |
|  | 1-2 | LiFSl | AB | WS-700, PAA-NH$_4$, Na alginate | 98 | 103 |
|  | 1-3 | LiFSl | CNT | PSS | 89 | 109 |
|  | 1-4 | LiFSl | AB | PSS | 85 | 94 |
|  | 1-5 | LiFSl | CNT | polyamide acid | 91 | 104 |
|  | 1-6 | LiFSl | AB | polyamide acid | 95 | 91 |
|  | 1-7 | LiFSl | CNT | PTPA-PBA-SO$_3$H, PAA | 101 | 105 |
| Comparative Example | 1-1 | LiPF$_6$ | CNT | WS-700, PAA-NH$_4$, Na alginate | 52 | 49 |
|  | 1-2 | LiPF$_6$ | AB | WS-700, PAA-NH$_4$, Na alginate | 55 | 43 |
|  | 1-3 | LiPF$_6$ | CNT | PSS | 48 | 41 |
|  | 1-4 | LiPF$_6$ | AB | PSS | 44 | 35 |
|  | 1-5 | LiPF$_6$ | CNT | polyamide acid | 56 | 41 |
|  | 1-6 | LiPF$_6$ | AB | polyamide acid | 57 | 48 |
|  | 1-7 | LiPF$_6$ | CNT | PTPA-PBA-SO$_3$H, PAA | 35 | 40 |
|  | 1-8 | LiFSl | — | — | 48 | 0.57 |

As shown in Table 2, the cells produced in Working Examples 1-1 to 1-7 exhibit larger discharge capacities and capacity retentions than the cell produced in Comparative Example 1-8. As described above, in the Comparative Example 1-8 cell, it appears that the resistance of the secondary cell rises, and the developed capacity at the high discharge rate of 10 C decreases, on account of corrosion of the current-collecting substrates by the sulfonylimide electrolyte; it also appears that, due to corrosion associated with charging and discharging through 300 cycles, the resistance of the secondary cell rises, leading to a deterioration in capacity. By contrast, in the cells of Working Examples 1-1 to 1-7, presumably owing to the fact that corrosion can be suppressed by the conductive protective layer, the percent capacity retention becomes very high, in addition to which, because of the low resistance, a large developed capacity is exhibited even at the high discharge ratio of 10 C.

Also, the cells produced in Working Examples 1-1 to 1-7 exhibited discharge capacities and percent capacity retentions that were about twice as high as those of the cells produced in Comparative Examples 1-1 to 1-7. This is because corrosion of the current-collecting substrates by LiFSl is suppressed by the conductive protective layer, as a result of which the higher ionic mobility, thermal stability and chemical stability possessed by LiFSl relative to LiPF$_6$ improved the cycle characteristics, safety, capacity and output characteristics of the cell.

As demonstrated above, in the secondary cell of the invention, because a conductive protective layer capable of suppressing corrosion of the current-collecting substrates by a sulfonylimide electrolyte can be easily formed merely by coating onto a base material and corrosion of the current-collecting substrates is thereby suppressed, the cycle characteristics, safety, capacity and output characteristics of the cell can be improved owing to the high ionic mobility, thermal stability and chemical stability of the sulfonylimide electrode. By using the resulting electrode as the positive electrode of a lithium ion secondary cell in particular, secondary cells having good characteristics can be obtained, current can be drawn without causing a voltage drop in applications requiring a large instantaneous current such as electric car applications, and secondary cells having a long cycle life and a good safety can be produced.

The invention claimed is:

1. A nonaqueous secondary cell comprising:
   a positive electrode having a positive electrode current-collecting substrate, an electrically conductive protective layer formed on the surface of the positive electrode current-collecting substrate and a positive electrode active material layer capable of intercalating and deintercalating lithium formed on the surface of the electrically conductive protective layer;
   a negative electrode having a negative electrode current-collecting substrate and, formed on top thereof, a negative electrode active material layer capable of intercalating and deintercalating lithium;
   a separator interposed between the positive and electrode electrodes; and
   a nonaqueous electrolyte solution, wherein
   the nonaqueous electrolyte solution comprises a sulfonylimide electrolyte and a nonaqueous organic solvent,
   the electrically conductive protective layer an electrically conductive carbon material dispersed in a binder resin, and
   the conductive carbon material is at least one selected from the group consisting of fibrous conductive carbon materials and particulate conductive carbon materials.

2. The nonaqueous secondary cell of claim 1, wherein the nonaqueous electrolyte solution consists of a sulfonylimide electrolyte and a nonaqueous organic solvent.

3. The nonaqueous secondary cell of claim 1 or 2, wherein the positive electrode active material layer includes lithium iron phosphate as the positive electrode active material.

4. The nonaqueous secondary cell of claim 1, wherein the conductive carbon material is at least one selected from the group consisting of carbon nanotubes and carbon black.

5. The nonaqueous secondary cell of claim 1, wherein the sulfonylimide electrolyte is lithium bis(fluorosulfonyl)imide.

6. The nonaqueous secondary cell of claim 5, wherein the nonaqueous organic solvent is an aprotic polar solvent and the lithium bis(fluorosulfonyl)imide is dissolved in the aprotic polar solvent.

7. The nonaqueous secondary cell of claim 1, wherein one or both of the positive electrode current-collecting substrate and the negative electrode current-collecting substrate include aluminum.

8. The nonaqueous secondary cell of claim 1, wherein the positive electrode current-collecting substrate is aluminum foil.

9. The nonaqueous secondary cell of claim 1, wherein the electrically conductive protective layer has a thickness of from 0.001 to 1 μm.

10. The nonaqueous secondary cell of claim 1, wherein the binder resin includes an acidic polymer.

11. The nonaqueous secondary cell of claim 10, wherein the acidic polymer has a carboxyl group or a sulfo group.

* * * * *